(12) United States Patent
Chun et al.

(10) Patent No.: US 9,823,846 B2
(45) Date of Patent: Nov. 21, 2017

(54) SYSTEMS AND METHODS FOR EXPANDING MEMORY FOR A SYSTEM ON CHIP

(71) Applicant: QUALCOMM INCORPORATED, San Diego, CA (US)

(72) Inventors: Dexter Tamio Chun, San Diego, CA (US); Suryanarayana China Chittuluri, San Diego, CA (US); Yanru Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 241 days.

(21) Appl. No.: 14/464,598

(22) Filed: Aug. 20, 2014

(65) Prior Publication Data
US 2016/0054928 A1    Feb. 25, 2016

(51) Int. Cl.
*G06F 12/00*    (2006.01)
*G06F 3/06*    (2006.01)
(Continued)

(52) U.S. Cl.
CPC .......... *G06F 3/0607* (2013.01); *G06F 3/0631* (2013.01); *G06F 3/0665* (2013.01);
(Continued)

(58) Field of Classification Search
CPC .. H03M 7/3084; G06F 3/0641; G06F 3/0643; G06F 3/0689; G06F 3/0608; G06F 3/0665
(Continued)

(56) References Cited

U.S. PATENT DOCUMENTS 5,793,620 A * 8/1998 Burnworth ............ G06F 13/409
361/748
6,141,712 A 10/2000 Sudhakaran et al.
(Continued)

FOREIGN PATENT DOCUMENTS

EP    2757483 A1    7/2014

OTHER PUBLICATIONS

Welsh et.al. "Memorymanagement for User-Level Network Interfaces" IEEE Mar./Apr. 1998 pp. 77-82.*
(Continued)

*Primary Examiner* — Yaima Rigol
*Assistant Examiner* — Tasnima Matin
(74) *Attorney, Agent, or Firm* — Smith Tempel Blaha LLC

(57) ABSTRACT

Systems and methods are disclosed for expanding memory for a system on chip (SoC). A memory card is loaded in an expandable memory socket electrically and is coupled to a system on chip (SoC) via an expansion bus. The memory card comprises a first volatile memory device. In response to detecting the memory card, an expanded virtual memory map is configured. The expanded virtual memory map comprises a first virtual memory space associated the first volatile memory device and a second virtual memory space associated with a second volatile memory device electrically coupled to the SoC via a memory bus. One or more peripheral images associated with the second virtual memory space are relocated to a first portion of the first virtual memory space. A second portion of the first virtual memory space is configured as a block device for performing swap operations associated with the second virtual memory space.

30 Claims, 7 Drawing Sheets

(51) Int. Cl.
*G06F 12/10* (2016.01)
*G06F 12/06* (2006.01)
*G06F 13/16* (2006.01)

(52) U.S. Cl.
CPC ............ *G06F 3/0683* (2013.01); *G06F 12/06* (2013.01); *G06F 12/10* (2013.01); *G06F 13/1684* (2013.01); *G06F 2212/1048* (2013.01); *G06F 2212/152* (2013.01); *G06F 2212/171* (2013.01); *G06F 2212/206* (2013.01); *G06F 2212/261* (2013.01)

(58) Field of Classification Search
USPC .......................................................... 711/103
See application file for complete search history.

(56) References Cited

U.S. PATENT DOCUMENTS

| | | | |
|---|---|---|---|
| 6,886,076 B1 | 4/2005 | Isodono et al. | |
| 7,715,028 B2 | 5/2010 | Kawaura | |
| 8,209,463 B2 | 6/2012 | Tzeng | |
| 2001/0023992 A1 | 9/2001 | Doll | |
| 2007/0288692 A1* | 12/2007 | Bruce | G06F 3/061 711/113 |
| 2008/0183945 A1* | 7/2008 | Hughes | G06F 12/0246 711/100 |
| 2010/0082881 A1* | 4/2010 | Klein | G06F 3/0607 711/103 |
| 2011/0016269 A1* | 1/2011 | Lee | G11O 5/04 711/105 |
| 2011/0072235 A1* | 3/2011 | Deming | G06F 12/1027 711/207 |
| 2011/0161969 A1* | 6/2011 | Arndt | G06F 9/4881 718/103 |
| 2012/0151287 A1* | 6/2012 | Le | G06F 11/273 714/718 |
| 2014/0164689 A1* | 6/2014 | Chun | G06F 13/1647 711/105 |
| 2014/0164720 A1* | 6/2014 | Stewart | G06F 12/0607 711/157 |
| 2014/0208006 A1* | 7/2014 | Yun | G06F 13/382 711/103 |
| 2015/0324285 A1* | 11/2015 | Murphy | G06F 12/0292 711/6 |

OTHER PUBLICATIONS

International Search Report and Written Opinion—PCT/US2015/045133—ISA/EPO—Dec. 18, 2015.

* cited by examiner

SYSTEMS AND METHODS FOR EXPANDING MEMORY FOR A SYSTEM ON CHIP

DESCRIPTION OF THE RELATED ART

Portable computing devices (e.g., cellular telephones, smart phones, tablet computer, portable digital assistants (PDAs), and portable game consoles) continue to offer an ever-expanding array of features and services, and provide users with unprecedented levels of access to information, resources, and communications. To keep pace with these service enhancements, such devices have become more powerful and more complex. Portable computing devices now commonly include a system on chip (SoC) comprising one or more chip components embedded on a single substrate (e.g., one or more central processing units (CPUs), a graphics processing unit (GPU), digital signal processors, etc.).

System memory in such portable computing devices typically comprises dynamic random access memory (DRAM). One or more DRAM devices may be electrically coupled to the SoC via a high-performance memory bus. DRAM process technology continues to scale down to accommodate increasing demands for greater memory capacity in smaller chips. While denser DRAM chips provide desirable performance and design advantages, the costs of increasing DRAM capacity combined with downward price pressures due to consumer expectations, can adversely impact profit margins for original equipment manufacturers.

Accordingly, there is a need for improved systems and methods for expanding DRAM in these and other portable computing devices.

SUMMARY OF THE DISCLOSURE

Systems, methods, and computer programs are disclosed for expanding memory for a system on chip (SoC). One such method involves detecting a memory card loaded in an expandable memory socket electrically coupled to a system on chip (SoC) via an expansion bus. The memory card comprises a first volatile memory device. In response to detecting the memory card, an expanded virtual memory map is configured. The expanded virtual memory map comprises a first virtual memory space associated the first volatile memory device and a second virtual memory space associated with a second volatile memory device electrically coupled to the SoC via a high-performance memory bus. One or more peripheral images associated with the second virtual memory space are relocated to a first portion of the first virtual memory space. A second portion of the first virtual memory space is configured as a block device for performing swap operations associated with the second virtual memory space.

Another embodiment is a system comprising a system on chip (SoC) electrically coupled to a first volatile memory device via a high-performance memory bus. An expandable memory socket is electrically coupled to the SoC via an expansion bus. The SoC comprises a processor configured to: detect a memory card loaded in the expandable memory socket, the memory card comprising a second volatile memory device; in response to detecting the memory card, configure an expanded virtual memory map comprising a first virtual memory space associated the first volatile memory device and a second virtual memory space associated with the second volatile memory device; relocate one or more peripheral images in the first virtual memory space to a first portion of the second virtual memory space; and configure a second portion of the second virtual memory space as a block device for performing swap operations associated with the first virtual memory space.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

Figure 1:
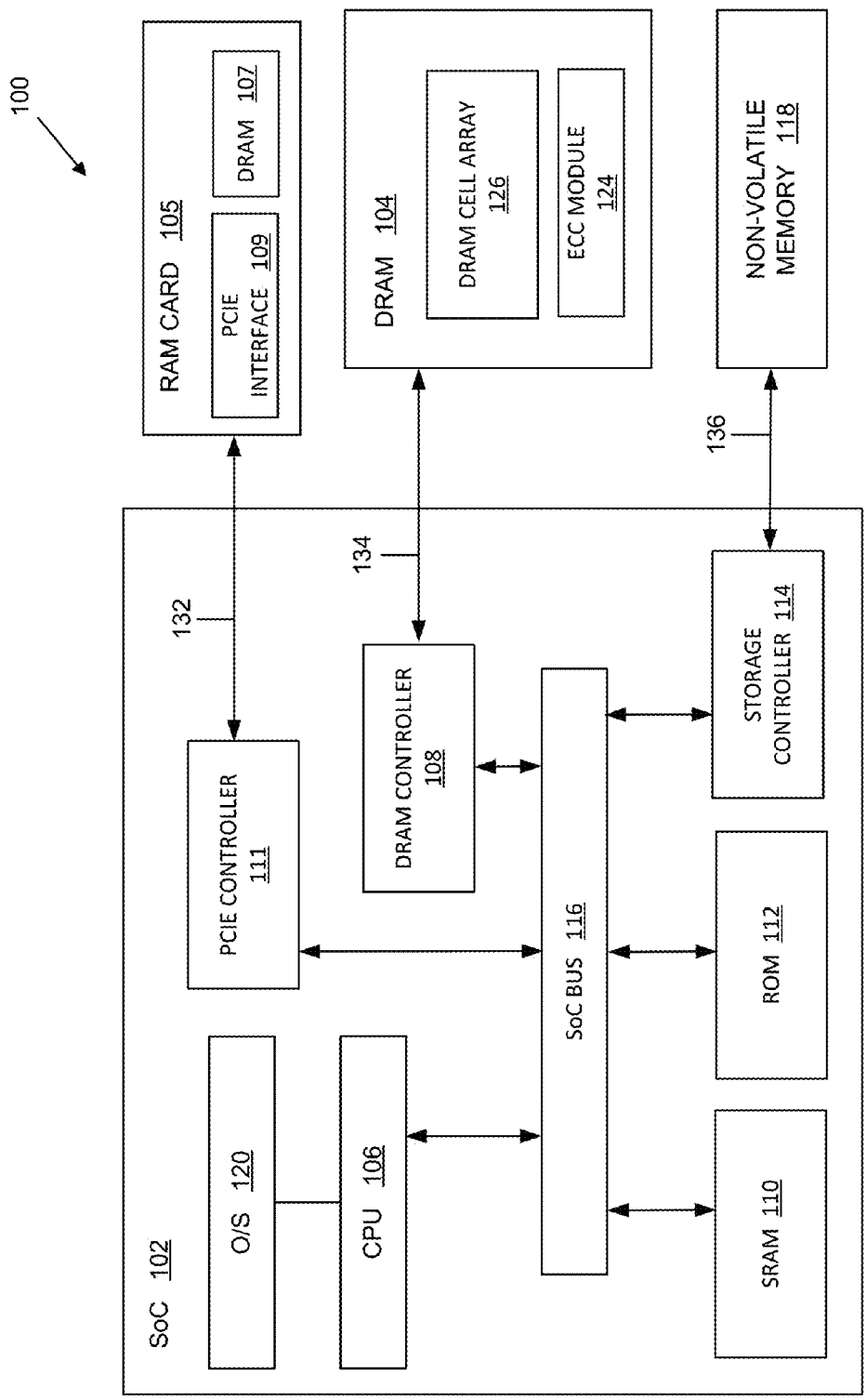
FIG. 1 is a block diagram of an embodiment of a system for expanding memory in an exemplary portable communication device.

The word "exemplary" is used herein to mean "serving as an example, instance, or illustration." Any aspect described herein as "exemplary" is not necessarily to be construed as preferred or advantageous over other aspects.

In this description, the term "application" or "image" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The term "virtual memory" refers to the abstraction of the actual physical memory from the application or image that is referencing the memory. A translation or mapping may be used to convert a virtual memory address to a physical memory address. The mapping may be as simple as 1-to-1 (e.g., physical address equals virtual address), moderately complex (e.g., a physical address equals a constant offset from the virtual address), or the mapping may be complex (e.g., every 4 KB page mapped uniquely). The mapping may be static (e.g., performed once at startup), or the mapping may be dynamic (e.g., continuously evolving as memory is allocated and freed).

In this description, the terms "communication device," "wireless device," "wireless telephone", "wireless communication device," and "wireless handset" are used interchangeably. With the advent of third generation ("3G") wireless technology and four generation ("4G"), greater bandwidth availability has enabled more portable computing devices with a greater variety of wireless capabilities. Therefore, a portable computing device may include a cellular telephone, a pager, a PDA, a smartphone, a navigation device, or a hand-held computer with a wireless connection or link.

FIG. 1 illustrates an embodiment of a system 100 for expanding memory for a system on chip (SoC) 102. The system 100 may be implemented in any computing device, including a personal computer, a workstation, a server, a portable computing device (PCD), such as a cellular telephone, a portable digital assistant (PDA), a portable game console, a palmtop computer, or a tablet computer. As illustrated in the embodiment of FIG. 1, the system 100 comprises a system on chip (SoC) 102 electrically coupled to a DRAM memory system 104, a non-volatile memory 118, and an expandable random access memory (RAM) card 105. DRAM memory system 104 interfaces with the SoC via a high-performance memory bus 134. The non-volatile memory 118 interfaces with the SoC via a storage bus 136. Non-volatile memory 118 may comprise any non-volatile memory, such as, for example, flash memory, flash drive, a Secure Digital (SD) card, a solid-state drive (SSD), or other types. In certain embodiments, due to the large quantity of pins to support the high-performance memory bus 134, the sensitive radio frequency circuits in close proximity to the SoC 102, and the limited distance that the high-performance memory bus 134 can travel without causing interference, it may difficult and costly to implement an expandable DRAM memory system 104.

The expandable RAM card 105 is electrically coupled to the SoC 102 via an expansion bus 132. As described below in more detail, in an embodiment, the expandable RAM card 105 may comprise a removable memory card or other device, which may be loaded into a user-accessible memory socket 302. In this manner, the system 100 may enable a user to conveniently add additional memory capacity to the portable computing device after purchase. The system 100 provides an extensible high-performance swap memory system that may be leveraged by an original equipment manufacturer. As known in the art, portable computing system performance and application responsiveness improves with increasing RAM size and that it degrades with decreasing RAM. User population may vary in the types and quantity of applications that they install and engage in their daily use. For example, simple users may find 2 GB of RAM completely adequate, while expert or enthusiast users running multiple complex applications or games may need 4 GB or more before their user experience becomes satisfactory. One of ordinary skill in the art will appreciate that the system 100 may be desirable to an original equipment manufacturer (OEM) because it may enable the OEM to advertise increased performance while minimizing the OEM bill of materials. Other benefits of using expandable RAM card 105 may include, for example, providing much faster response than using traditional storage devices in most common practice as a swap device, and supporting asymmetric DRAM population (e.g., LPDDR4 for DRAM 104 and LPDDR3 for expandable RAM card 105), in a cost-effective way that is supported by the O/S 120.

The expansion bus 132 comprises a direct memory access bus, such as, for example, a peripheral component interconnection express (PCIE) bus. As known in the art, a PCIE bus 132 comprises a high-speed serial computer expansion bus, which provides various desirable characteristics, such as, higher maximum system bus throughput, lower I/O pin count and smaller physical footprint, improved performance-scaling for bus devices, reliable error detection and reporting mechanisms, native hot-plug functionality, and hardware I/O virtualization. As illustrated in FIG. 1, the RAM card 105 may comprise a DRAM 107 and a PCIE or other interface 109 configured to communicate with a corresponding PCIE or other controller 111 via the expansion bus 132.

The SoC 102 comprises various on-chip components, including a central processing unit (CPU) 106, a DRAM controller 108, static random access memory (SRAM) 110, read only memory (ROM) 112, and a storage controller 114 interconnected via a SoC bus 116. The SoC 102 may include one or more memory clients that request memory resources from DRAM 104 and DRAM 107 when loaded into the socket 302. The memory clients may comprise one or more processing units (e.g., central processing unit (CPU) 106, a graphics processing unit (GPU), a digital signal processor (DSP), etc.), a video encoder, or other clients requesting memory read/write access.

Storage controller 114 on SoC 102 is electrically coupled to non-volatile memory 118 via storage bus 136. Storage controller 114 manages the data stored on non-volatile memory 118. DRAM controller 108 is electrically coupled to DRAM 104 via, for example, a high-performance RAM bus 134. DRAM controller 108 manages the flow of data going to and from the DRAM 104. DRAM controller 108 generally comprises the logic for reading and writing to DRAM 104.

As further illustrated in FIG. 1, DRAM 104 may comprise an error correcting code (ECC) module 124. ECC module 124 detects double-bit errors and corrects single-bit errors during DRAM operations (e.g., read and/or write operations). For example, during a DRAM write operation, the ECC module 124 may use the write data as input and then generate redundant parity check bits. The combined write data and parity check bits together form a unit known as a codeword and may be stored either separated or together in the DRAM cell array 126. During a read operation, the ECC module 124 may use the retrieved data portion of the codeword to recomputed the parity check bits and then compare these against the parity check bits portion of the codeword that was stored during the write operation. A mismatch between the read recomputed parity and the stored parity indicates a detected error. In addition, the parity check bits may be sufficient to provide single error correction within the codeword.

Figure 2:
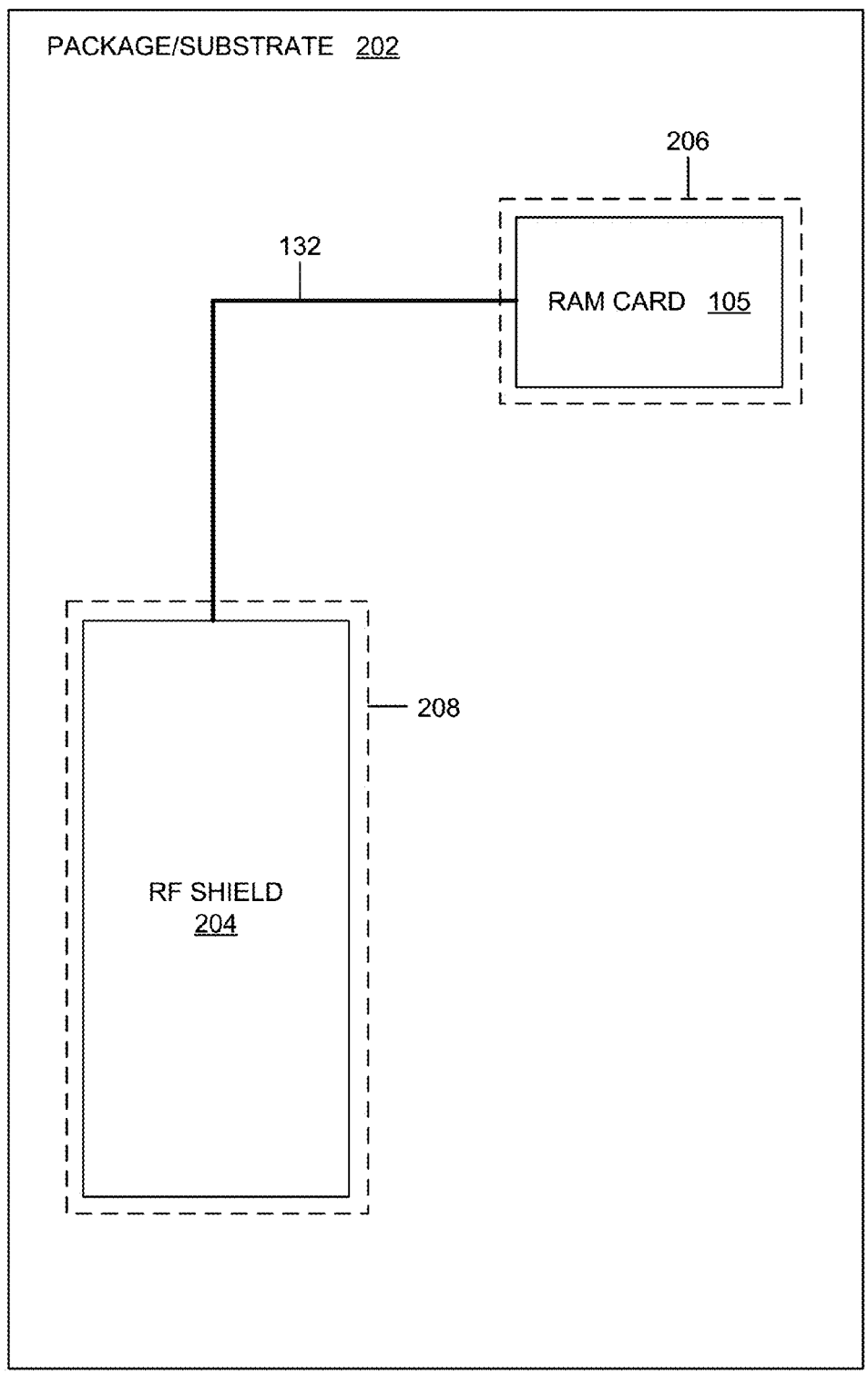
FIG. 2 is an overhead schematic view of a package/substrate of the portable communication device of FIG. 1.
Figure 3:
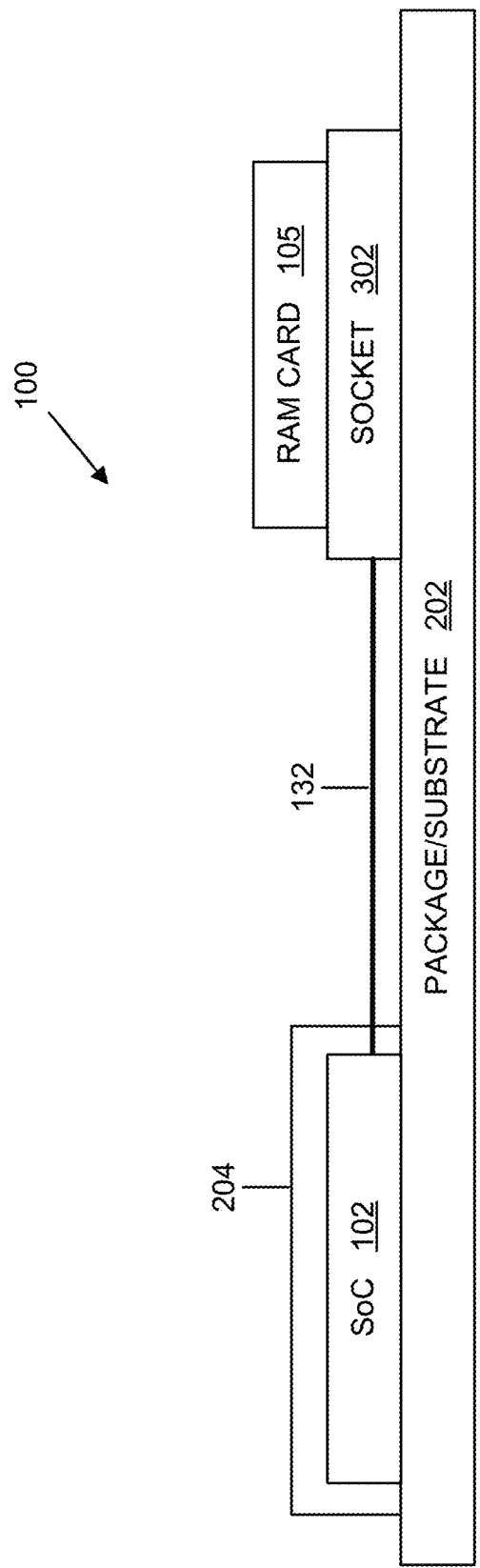
FIG. 3 is a cross-sectional view of the expandable RAM card/socket and SoC in FIG. 2.

FIGS. 2 & 3 illustrate an embodiment of a package/substrate 202 for incorporating system 100 in a portable computing device. The SoC 102 and/or the DRAM 104 may be disposed at a first location 208 on the package/substrate 202. In an embodiment, the DRAM 104 may be soldered onto a CPU package and the combined DRAM/CPU may be soldered to a mainboard. As illustrated in FIG. 3, the SoC 102 and/or the DRAM 104 may be covered by a radio frequency (RF) shield 204 to shield other components from DDR signal noise. As known in the art, DDR signals may create substantial common-mode radiation that could impact other components on the package/substrate 202. In this regard, the socket 302 may be remotely located at a second location 206 on the package/substrate 202.

In an embodiment, the socket 302 is configured to carry PCIE interface signals (e.g., 44 I/O pins for ×4 lanes). A PCIE 4× lane provides 4 GB/sec bandwidth to DRAM 104. A PCIE 8× lane using more pins may provide 8 GB/sec bandwidth to DRAM 104. The PCIE controller 111 may be configured to translate the PCIE bus 132, which may include memory control operations similar to DRAM controller 108. In an embodiment, RAM card 105 may be offered in various configurations, including but not limited to: different DDR JEDEC standards such as LPDDR1, LPDDR2, LPDDR3, LPDDR4, etc.; different capacities such as 512 MB, 1 GB, 2 GB, etc; different performance grades such as 4 GB/sec, 8 GB/sec, etc.; combining with other functions such as PCIE, eMMC, or UFS flash storage expansion such as 512 MB RAM expansion plus 8 GB flash expansion on a single card. A combination functions may be implemented by including the relevant capability into the PCIE controller 111. For example, the PCIE controller 111 may be configured to translate the PCIE bus 132 to an eMMC flash storage bus. Furthermore, the RAM card 105 may contain multiple stacked memory chips connected to PCIE controller 111 to provide the advertised capacity.

Figure 4:
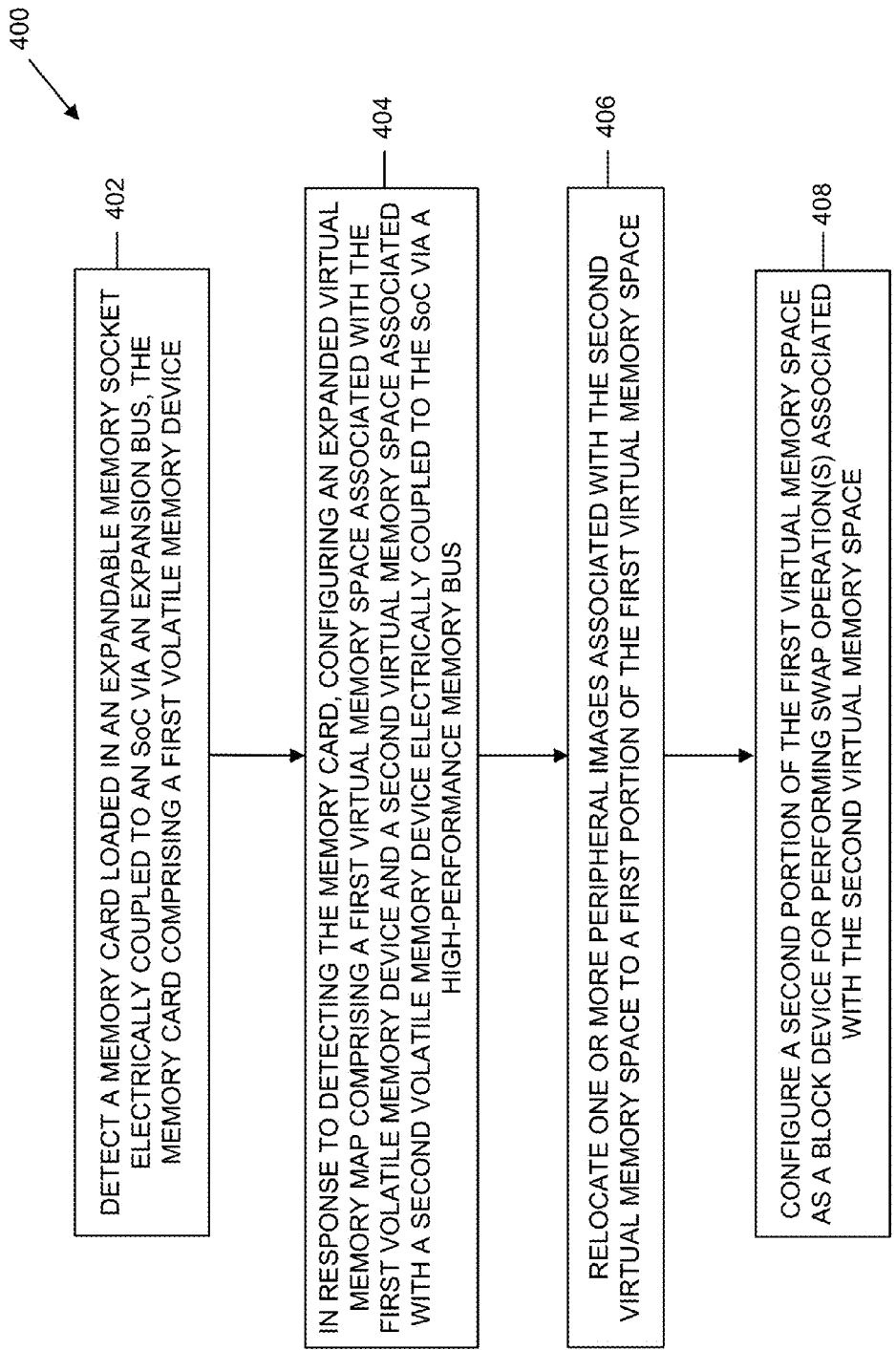
FIG. 4 is a flowchart illustrating an embodiment of a method for expanding system memory for the SoC in FIGS. 1-3.
Figure 5:
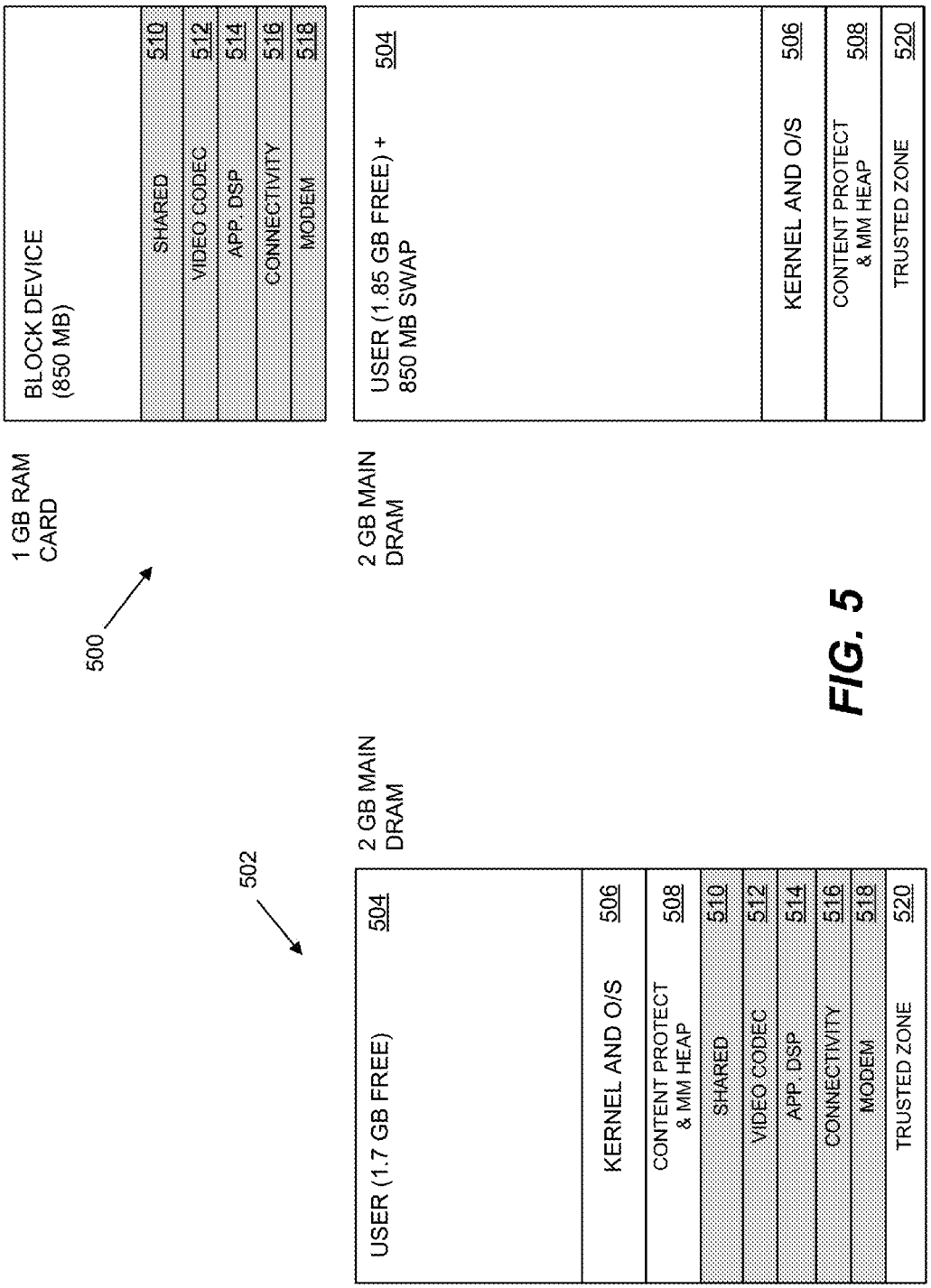
FIG. 5 is a block diagram illustrating an embodiment of an expanded virtual memory map.

FIG. 4 is a flowchart illustrating an embodiment of a method for expanding memory in system 100. At block 402, the system 100 detects that a memory card (e.g., RAM card 105) is loaded in an expandable memory socket 302. As mentioned above, the memory socket 302 is electrically coupled to the SoC 102 via the expansion bus 132. The memory card may comprise a first volatile memory device (e.g., DRAM 107—having a capacity of 1 GB). If a memory card is detected, at block 404, the system 100 configures an expanded virtual memory map 500. FIG. 5 illustrates an embodiment of the expanded virtual memory map 500. Memory map 502 illustrates the virtual memory map for a DRAM 104 (having a capacity of 2 GB) without the memory card loaded in the expandable memory socket 302. Address range 506 is assigned to kernel and O/S 120. Address ranges 508 and 520 may be assigned to a content protection and multimedia heap and trusted zone(s), respectively. Additional address ranges may be assigned to one or more peripheral images assigned to specific hardware resources (e.g., shared resources 510, video codec 512, an application digital signal processor (DSP) 514, connectivity hardware 516, modem 518, etc.). As illustrated in the embodiment of FIG. 5, address ranges 506-520 comprise 300 MB of memory capacity, leaving 1.7 GB of available user space. It should be appreciated that this is only one of many possible examples of how the images may be rearranged within memory for the purpose of increasing the user area 504.

When a memory card is detected, the expanded virtual memory map is configured with a first virtual memory space associated with the first volatile memory device (e.g., 1 GB DRAM 107). A second virtual memory space is associated with the 2 GB DRAM 104. At block 406, the system 100 may relocate one or more of the peripheral images associated with the second virtual memory space to a first portion of the first virtual memory space. As illustrated in FIG. 5, peripheral images associated with address ranges 510, 512, 514, 516, and 518 are relocated to 150 MB of the 1 GB RAM card. The peripheral images to be relocated may be selected according to bandwidth needs. For example, if the associated hardware resources can handle a reduced bandwidth via expansion bus 132 (as compared to the high-performance memory bus 134), they may be relocated. At block 408, the system 100 may configure a second portion of the first virtual memory space as a block device for performing swap operations associated with the second virtual memory space.

Figure 7:
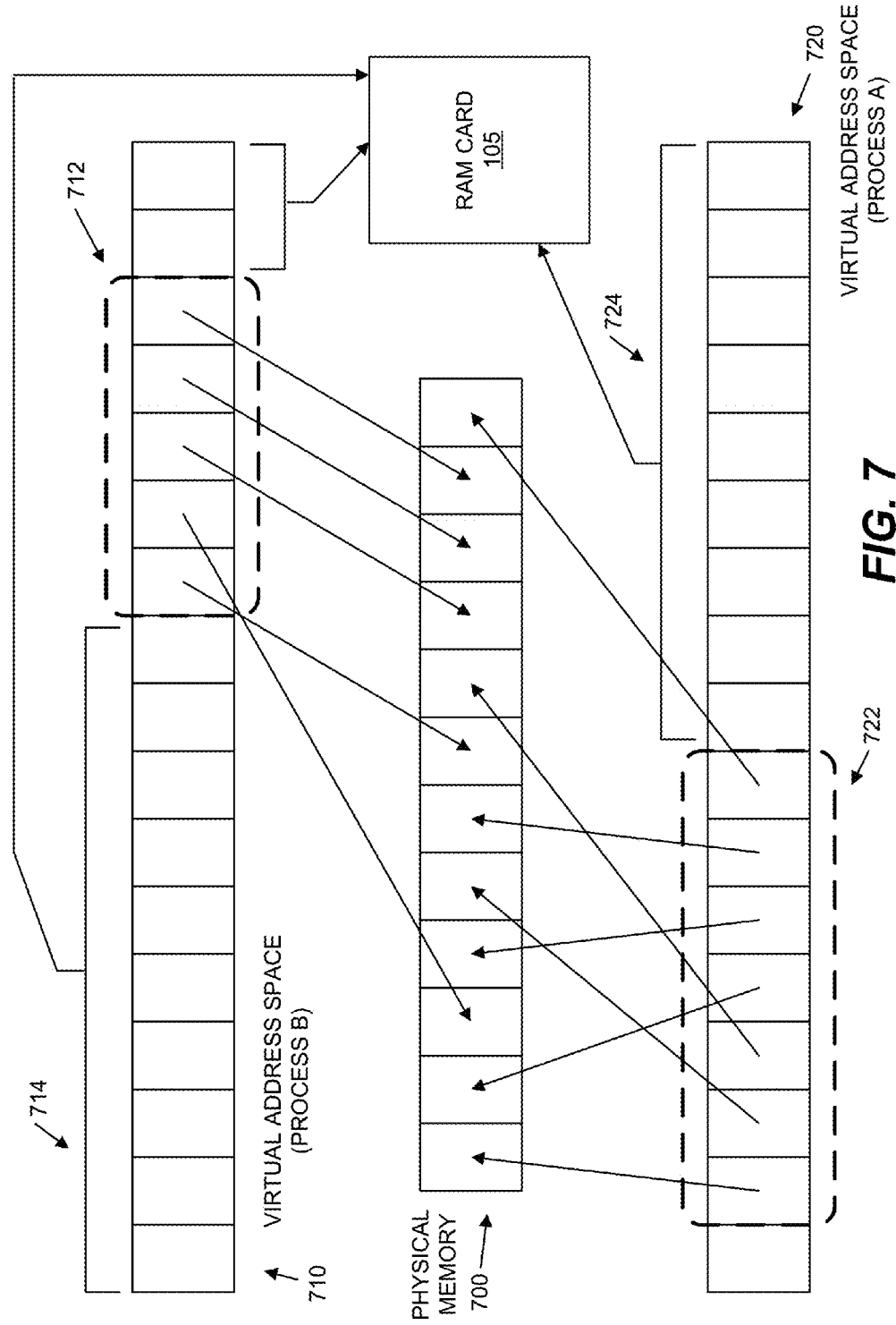
FIG. 7 is a schematic diagram illustrating an embodiment of a method for performing swap operations via the expanded virtual memory map of FIG. 5.

As illustrated in FIG. 7, there may be a limited amount of physical memory 700 available for the user (corresponding to the user space 504 in FIG. 5). Multiple processes running in a system may compete for this free memory space as shown by a first process 710 and a second process 720. While only two processes are illustrated in FIG. 7, it should be appreciated that many more processes may be running on a portable computing system. The total memory requested from all processes may exceed the available physical memory 700. The kernel and O/S 506 may categorize memory usage into one or more working sets (e.g., working sets 712 and 722) and one or more nonworking sets (e.g., nonworking sets 714 and 724) based upon, for example, the amount of recent activity. Although FIG. 7 shows this categorization as contiguous grouping, it should be appreciated that the memory pages shown as individual rectangles may be spread out and/or random. Memory pages that are recently and frequently accessed (i.e., read and/or written) may comprise the working sets 712 and 724 and most likely to be placed into physical memory 700, while memory pages that have not been accessed recently may comprise the nonworking sets 714 and 724 and are least likely to be placed into physical memory 700. The nonworking sets 714 and 724 may be placed into the RAM card 105. As time passes, processes may access different portions of memory, changing some pages from nonworking sets to working sets and vice versa. When this happens, the relevant pages may be moved between the physical memory 700 and the RAM card 105. This process is commonly known as swap. A portion of RAM card 105 may configured as a block device, which means that accesses may be performed in blocks (e.g., 4 KB pages). In conventional solutions, the swap block device may comprise a hard disk drive (HDD) or solid-state drive (SSD). One of ordinary skill in the art will appreciate that the RAM card 105 may significantly improve the performance of swap by, for example, offering peak bandwidth many times greater than a swap block device comprising the HDD or SSD.

Figure 6:
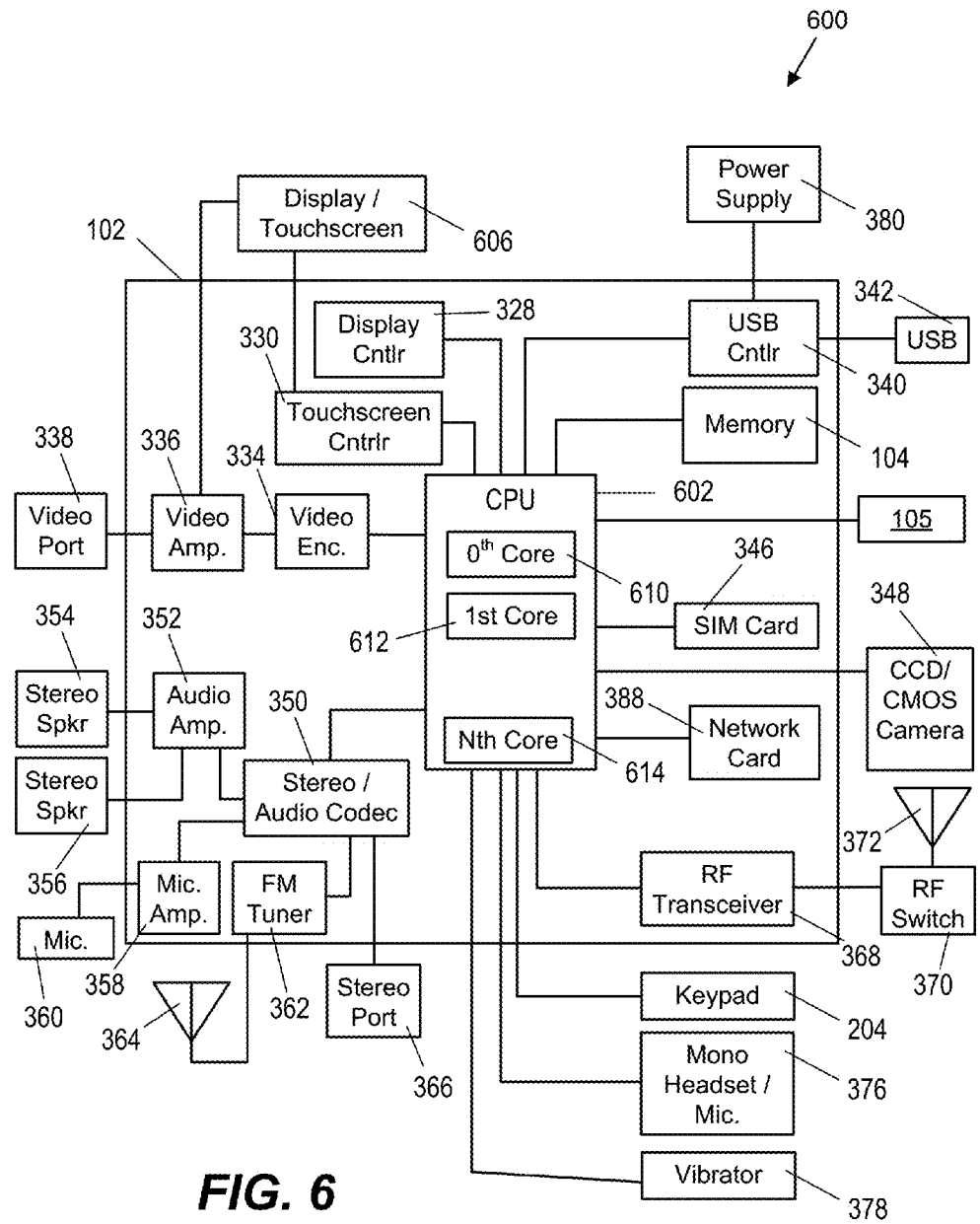
FIG. 6 is a block diagram of another embodiment of a portable communication device that may incorporate a RAM card/socket for expanding system memory.

As mentioned above, the system 100 may be incorporated into any desirable computing system. FIG. 6 illustrates the system 100 incorporated in an exemplary portable computing device (PCD) 600. In this embodiment, the SoC 102 may include a multicore CPU 602. The multicore CPU 602 may include a zeroth core 610, a first core 612, and an Nth core 614. One of the cores may comprise, for example, a graphics processing unit (GPU) with one or more of the others comprising the CPU.

A display controller 328 and a touch screen controller 330 may be coupled to the CPU 602. In turn, the touch screen display 606 external to the on-chip system 102 may be coupled to the display controller 328 and the touch screen controller 330.

FIG. 6 further shows that a video encoder 334, e.g., a phase alternating line (PAL) encoder, a sequential color a memoire (SECAM) encoder, or a national television system(s) committee (NTSC) encoder, is coupled to the multicore CPU 602. Further, a video amplifier 336 is coupled to the video encoder 334 and the touch screen display 606. Also, a video port 338 is coupled to the video amplifier 336. As shown in FIG. 6, a universal serial bus (USB) controller 340 is coupled to the multicore CPU 602. Also, a USB port 342 is coupled to the USB controller 340. Memory 104 and a subscriber identity module (SIM) card 346 may also be coupled to the multicore CPU 602.

Further, as shown in FIG. 6, a digital camera 348 may be coupled to the multicore CPU 602. In an exemplary aspect, the digital camera 348 is a charge-coupled device (CCD) camera or a complementary metal-oxide semiconductor (CMOS) camera.

As further illustrated in FIG. 6, a stereo audio coder-decoder (CODEC) 350 may be coupled to the multicore CPU 602. Moreover, an audio amplifier 352 may coupled to the stereo audio CODEC 350. In an exemplary aspect, a first stereo speaker 354 and a second stereo speaker 356 are coupled to the audio amplifier 352. FIG. 6 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 6 further illustrates that a radio frequency (RF) transceiver 368 may be coupled to the multicore CPU 602. An RF switch 370 may be coupled to the RF transceiver 368 and an RF antenna 372. A keypad 204 may be coupled to the multicore CPU 602. Also, a mono headset with a microphone 376 may be coupled to the multicore CPU 602. Further, a vibrator device 378 may be coupled to the multicore CPU 602.

FIG. 6 also shows that a power supply 380 may be coupled to the on-chip system 102. In a particular aspect, the power supply 380 is a direct current (DC) power supply that provides power to the various components of the PCD 600 that require power. Further, in a particular aspect, the power supply is a rechargeable DC battery or a DC power supply that is derived from an alternating current (AC) to DC transformer that is connected to an AC power source.

FIG. 6 further indicates that the PCD 600 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, a television/cable/satellite tuner, or any other network card well known in the art. Further, the network card 388 may be incorporated into a chip, i.e., the network card 388 may be a full solution in a chip, and may not be a separate network card 388.

Referring to FIG. 6, it should be appreciated that the memory 104, the RAM card 105, touch screen display 606, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 may be external to the on-chip system 102.

It should be appreciated that one or more of the method steps described herein may be stored in the memory as computer program instructions, such as the modules described above. These instructions may be executed by any suitable processor in combination or in concert with the corresponding module to perform the methods described herein.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for expanding memory for a system on chip (SoC), the method comprising, the method comprising:
    detecting a memory card loaded in an expandable memory socket electrically coupled to a system on chip (SoC) via an expansion bus, the memory card comprising a first volatile memory device;
    in response to detecting the memory card, configuring an expanded virtual memory map comprising a first virtual memory space associated with the first volatile memory device and a second virtual memory space associated with a second volatile memory device electrically coupled to the SoC via a high-performance memory bus;
    relocating one or more peripheral images associated with the second virtual memory space and assigned only to hardware resources to a first portion of the first virtual memory space; and
    configuring a second portion of the first virtual memory space as a block device for performing swap operations associated with the second virtual memory space.

2. The method of claim 1, wherein the expansion bus comprises a peripheral component interconnect express (PCIE) bus.

3. The method of claim 1, wherein the expansion bus comprises a direct memory access bus.

4. The method of claim 1, wherein the first and second volatile memory devices comprise dynamic random access memory (DRAM).

5. The method of claim 1, wherein the memory card is removable from the expandable memory socket.

6. The method of claim 1, wherein the SoC and first and second volatile memory devices are implemented in a portable communication device.

7. The method of claim 6, wherein the SOC and the second volatile memory device are disposed under a radio frequency (RF) shield, and the first volatile memory device is remotely located from the RF shield.

8. A system for expanding system memory associated with a system on chip (SoC), the system comprising:
    means for detecting a memory card loaded in an expandable memory socket electrically coupled to a system on chip (SoC) via an expansion bus, the memory card comprising a first volatile memory device;
    means for configuring an expanded virtual memory map in response to detecting the memory card, the expanded virtual memory map comprising a first virtual memory space associated with the first volatile memory device and a second virtual memory space associated with a second volatile memory device electrically coupled to the SoC via a high-performance memory bus;
    means for relocating one or more peripheral images associated with the second virtual memory space and assigned only to hardware resources to a first portion of the first virtual memory space; and
    means for configuring a second portion of the first virtual memory space as a block device for performing swap operations associated with the second virtual memory space.

9. The system of claim 8, wherein the means for detecting the memory card loaded in the expandable memory socket comprises a peripheral component interconnect express (PCIE) controller located on the SoC.

10. The system of claim 8, wherein the expansion bus comprises a direct memory access bus.

11. The system of claim 8, wherein the first and second volatile memory devices comprise dynamic random access memory (DRAM).

12. The system of claim 8, wherein the memory card is removable from the expandable memory socket.

13. The system of claim 8, wherein the SoC and first and second volatile memory devices are implemented in a portable communication device.

14. The system of claim 13, wherein the SOC and the second volatile memory device are disposed under a radio frequency (RF) shield, and the expandable memory socket is remotely located from the RF shield.

15. A computer program embodied in a memory and executable by a processor for expanding memory associated with a system on chip (SoC), the computer program comprising logic configured to:
    detect a memory card loaded in an expandable memory socket electrically coupled to a system on chip (SoC) via an expansion bus, the memory card comprising a first volatile memory device;
    in response to detecting the memory card, configure an expanded virtual memory map comprising a first virtual memory space associated with the first volatile memory device and a second virtual memory space associated with a second volatile memory device electrically coupled to the SoC via a high-performance memory bus;
    relocate one or more peripheral images associated with the second virtual memory space and assigned only to hardware resources to a first portion of the first virtual memory space; and
    configure a second portion of the first virtual memory space as a block device for performing swap operations associated with the second virtual memory space.

16. The computer program of claim 15, wherein the expansion bus comprises a peripheral component interconnect express (PCIE) bus.

17. The computer program of claim 15, wherein the expansion bus comprises a direct memory access bus.

18. The computer program of claim 15, wherein the first and second volatile memory devices comprise dynamic random access memory (DRAM).

19. The computer program of claim 15, wherein the memory card is removable from the expandable memory socket.

20. The computer program of claim 15, wherein the SoC and first and second volatile memory devices are implemented in a portable communication device.

21. The computer program of claim 20, wherein the SOC and the second volatile memory device are disposed under a radio frequency (RF) shield, and the first volatile memory device is remotely located from the RF shield.

22. A system for expanding memory for a system on chip (SoC), the system comprising:
    a system on chip (SoC) electrically coupled to a first volatile memory device via a high-performance memory bus; and an expandable memory socket electrically coupled to the SoC via an expansion bus;

wherein the SoC comprises a processor configured to:
  detect a memory card loaded in the expandable memory socket, the memory card comprising a second volatile memory device;
  in response to detecting the memory card, configure an expanded virtual memory map comprising a first virtual memory space associated with the first volatile memory device and a second virtual memory space associated with the second volatile memory device;
  relocate one or more peripheral images associated with the second virtual memory space and assigned only to hardware resources to a first portion of the first virtual memory space; and
  configure a second portion of the second virtual memory space as a block device for performing swap operations associated with the second virtual memory space.

23. The system of claim 22, wherein the SoC and the first and second volatile memory devices reside in a portable communication device.

24. The system of claim 23, wherein the SOC and the first volatile memory device are disposed under a radio frequency (RF) shield.

25. The system of claim 24, wherein the expandable memory socket is remotely located from the RF shield.

26. The system of claim 23, wherein the portable communication device comprises one of a mobile phone, a tablet computer, and a portable game console.

27. The system of claim 22, wherein the expansion bus comprises a peripheral component interconnect express (PCIE) bus, and the SoC comprises PCIE controller for translating the PCIE bus to the high-performance memory bus.

28. The system of claim 22, wherein the first and second volatile memory devices comprise dynamic random access memory (DRAM).

29. The system of claim 22, wherein the memory card is user-loadable into the expandable memory socket.

30. The system of claim 22, wherein the expansion bus comprises a direct memory access bus.

* * * * *